US010774158B2

(12) United States Patent
Binder et al.

(10) Patent No.: US 10,774,158 B2
(45) Date of Patent: Sep. 15, 2020

(54) PROCESS FOR EPOXIDATION OF UNSATURATED POLYMER

(71) Applicant: ARLANXEO Singapore Pte. Ltd., Singapore (SG)

(72) Inventors: Brianna Binder, London (CA); Sarah Elliott, Bright (CA); Gregory J. E. Davidson, London (CA); Sharon Guo, London (CA)

(73) Assignee: ARLANXEO SINGAPORE PTE. LTD., Singapore (SG)

( * ) Notice: Subject to any disclaimer, the term of this patent is extended or adjusted under 35 U.S.C. 154(b) by 131 days.

(21) Appl. No.: 16/063,310

(22) PCT Filed: Dec. 14, 2016

(86) PCT No.: PCT/CA2016/051477
§ 371 (c)(1),
(2) Date: Jun. 18, 2018

(87) PCT Pub. No.: WO2017/100922
PCT Pub. Date: Jun. 22, 2017

(65) Prior Publication Data
US 2019/0002597 A1 Jan. 3, 2019

(30) Foreign Application Priority Data

Dec. 17, 2015 (EP) .................................. 15200726

(51) Int. Cl.
| C08C 19/06 | (2006.01) |
| C08K 5/14 | (2006.01) |
| C08F 8/08 | (2006.01) |
| C08L 15/00 | (2006.01) |
| C08J 3/22 | (2006.01) |
| C08J 3/20 | (2006.01) |

(52) U.S. Cl.
CPC ............... *C08C 19/06* (2013.01); *C08F 8/08* (2013.01); *C08K 5/14* (2013.01); *C08L 15/00* (2013.01); *C08F 2810/50* (2013.01); *C08J 3/203* (2013.01); *C08J 3/226* (2013.01); *C08J 2323/20* (2013.01); *C08J 2409/00* (2013.01); *C08J 2409/06* (2013.01); *C08J 2423/22* (2013.01); *C08J 2423/28* (2013.01)

(58) Field of Classification Search
CPC ................................ C08C 19/06; C08K 5/14
USPC ......................................................... 525/387
See application file for complete search history.

(56) References Cited

U.S. PATENT DOCUMENTS

| 2,356,128 A | 8/1944 | Thomas et al. |
| 2,701,895 A | 2/1955 | Tawney et al. |
| 3,093,613 A | 6/1963 | Fusco et al. |
| 3,165,496 A | 1/1965 | Fusco et al. |
| 3,551,518 A | 12/1970 | Pornin |
| 5,242,989 A | 9/1993 | Bening et al. |
| H001597 H * | 9/1996 | Erickson ............... C08F 297/02 522/158 |
| 5,886,106 A | 3/1999 | Sumner et al. |
| 2007/0276062 A1 | 11/2007 | Tirelli et al. |
| 2010/0292411 A1 | 11/2010 | Nakajima et al. |
| 2013/0345367 A1 | 12/2013 | Stojcevic et al. |
| 2014/0357794 A1 | 12/2014 | Mazumdar et al. |
| 2018/0362683 A1* | 12/2018 | Elliott ................... C08F 210/12 |
| 2019/0077889 A1 | 3/2019 | Nguyen |

FOREIGN PATENT DOCUMENTS

| CA | 2414932 A1 | 6/2003 |
| CA | 2557225 A1 | 2/2007 |
| CA | 2807735 A1 | 2/2012 |
| CA | 2894418 A1 | 6/2014 |
| CN | 1263902 A | 8/2000 |
| FR | 1383947 A | 1/1965 |
| GB | 774765 A * | 5/1957 ............... C08F 8/08 |
| WO | 94-00499 A1 | 1/1994 |

OTHER PUBLICATIONS

International Search Report and Written from International Application No. PCT/CA2016/051477, dated Feb. 22, 2017.
International Preliminary Report on Patentability from International Application No. PCT/CA2016/051477, dated Jun. 19, 2018.
Aubert Y, Coran, Encyclopedia of Polymer Science and Engineering, vol. 17, Transitions and Relaxations to Zwitterionic Polymerization, Vulcanization, 1990, John Wiley & Sons, vol. 17, pp. 666-698.
"Rubber Technology" (Third Edition) by Maurice Morton, Chapter 10 (Van Nostrand Reinhold Company © 1987), particularly pp. 297-300.
International Search Report and Written from International Application No. PCT/CA2016/051479, dated Mar. 7, 2017.
International Preliminary Report on Patentability from International Application No. PCT/CA2016/051479, dated Jun. 19, 2018.
International Search Report and Written from International Application No. PCT/CA2016/051478, dated Mar. 6, 2017.
International Preliminary Report on Patentability from International Application No. PCT/CA2016/051478, dated Jun. 19, 2018.
European Search Report, EP Patent Application No. 15200726 dated Jul. 13, 2016.
European Search Report, EP Patent Application No. 15200728 dated Jul. 22, 2016.
European Search Report, EP Patent Application No. 15200717 dated Jul. 21, 2016.
Commonly owned U.S. Appl. No. 16/063,327, filed Jun. 18, 2018, and published as US 2018/0362683 on Dec. 20, 2018.
Commonly owned U.S. Appl. No. 16/063,334, filed Nov. 20, 2018, and published as US 2019/0077889 on Mar. 14, 2019.

* cited by examiner

*Primary Examiner* — Michael J Feely
(74) *Attorney, Agent, or Firm* — The Dobrusin Law Firm, P.C.

(57) ABSTRACT

A process for epoxidation of an unsaturated polymer involves mixing an unsaturated polymer and a peroxy acid in an absence of solvent to produce an epoxidized polymer. The process may require no solvent, require no catalyst, require no or little applied external heat input, require no applied cooling, require less epoxidation agent, be faster and/or result in more efficient conversion of the unsaturated polymer.

20 Claims, No Drawings

PROCESS FOR EPOXIDATION OF UNSATURATED POLYMER

FIELD

This application relates to a process for epoxidation of unsaturated polymers, in particular unsaturated elastomers, especially unsaturated isoolefin copolymers, for example butyl rubber.

BACKGROUND

Epoxide groups are an effective way to impart polarity into unsaturated polymers, particularly unsaturated elastomers. The manufacturing of epoxidized elastomers generally requires long reaction times, the use of excess starting materials, the use of solvents, the use of catalysts and/or subsequent finishing through a basic medium prior to packaging resulting in high costs to produce. As a result, only epoxidized natural rubber is available commercially.

United States Patent Publication US 2014/357794 describes a method of functionalizing an elastomer, the first step of which is epoxidation. Therein, US 2014/357794 describes a typical epoxidation process in which the elastomer is treated with meta-chloroperoxybenzoic acid (mCPBA) in solution at reduced temperature (0° C.) for 6 hours in the presence of a catalyst.

United States Patent Publication US 2007/0276062 describes a process for producing an epoxidized elastomeric polymer in which at least one elastomeric polymer containing ethylenic unsaturation is mixed with at least one hydrogen peroxide precursor and at least one carboxylic acid or derivative thereof in the presence of water.

Chinese Patent Publication CN 1290709 describes a catalytic epoxidized reaction process for elastomers containing double bonds by reaction an alkyl hydrogen peroxide and the elastomer in the presence of a catalyst (i.e. a transition metal complex) without a solvent. This process specifically excludes peracid epoxidation systems.

Poly(isobutylene-co-isoprene), or IIR, is a synthetic elastomer commonly known as butyl rubber which has been prepared since the 1940's through the random cationic copolymerization of isobutylene with small amounts of isoprene (1-5 mole %). As a result of its molecular structure, IIR possesses superior air impermeability, a high loss modulus, oxidative stability and extended fatigue resistance.

Butyl rubber is understood to be a copolymer of an isoolefin and one or more, preferably conjugated, multiolefins as comonomers. Commercial butyl comprises a major portion of isoolefin and a minor amount, usually not more than 2.5 mol %, of a conjugated multiolefin. Butyl rubber or copolymer is generally prepared in a slurry process using methyl chloride as a diluent and a Friedel-Crafts catalyst as part of the polymerization initiator. This process is further described in U.S. Pat. No. 2,356,128 and Ullmanns Encyclopedia of Industrial Chemistry, volume A 23, 1993, pages 288-295, the entire contents of which are herein incorporated by reference.

A fast, efficient and cost-effective process for the epoxidation of unsaturated polymers, especially butyl rubber, is still desired.

SUMMARY

There is provided a process for epoxidation of an unsaturated polymer, comprising mixing an unsaturated polymer and a peroxy acid in an absence of solvent to produce an epoxidized polymer.

The process may have one or more advantages including requiring no solvent, requiring no catalyst, requiring no or little applied external heat input, requiring no applied cooling, requiring less epoxidation agent, being faster, and/or resulting in more efficient conversion of the polymer.

Further features will be described or will become apparent in the course of the following detailed description. It should be understood that each feature described herein may be utilized in any combination with any one or more of the other described features, and that each feature does not necessarily rely on the presence of another feature except where evident to one of skill in the art.

DETAILED DESCRIPTION

In accordance with the present invention, epoxidation of an unsaturated polymer comprises mixing an unsaturated polymer and a peroxy acid in an absence of solvent to produce an epoxidized polymer. The resulting epoxidized polymer is at least partially epoxidized. Conversion efficiencies (efficiencies of epoxidation) of up to 100% are achievable. Conversion efficiencies in a range of about 50-100%, or even about 60-100%, or even about 75-100% or even about 85-100% or even about 90-100% can be achieved, and are only dependent on purity of the peroxy acid. Such conversion efficiencies are achievable even in an absence of a catalyst. Preferably, the process may be conducted in an absence of a catalyst.

Mixing Parameters:

The unsaturated polymer is preferably mixed with the peroxy acid at a temperature at or above ambient temperature. Ambient temperature is the temperature at which the unsaturated polymer is being mixed with the peroxy acid in an absence of externally applied heating. The mixing process itself provides heat, which aids in the mixing process by softening the polymer. To reduce the chance of polymer degradation, it is preferable to mix the unsaturated polymer with the peroxy acid at a temperature of no more than about 95° C., more preferably no more than about 75° C., more preferably no more than about 65° C. and more preferably no more than about 50° C. While the act of mixing may raise the ambient temperature to about 30° C. or even higher, in some embodiments it may be desirable to apply more heat to raise the temperature even higher. In some embodiments, the unsaturated polymer may be mixed with the peroxy acid at a temperature in a range of ambient temperature to about 95° C., in a range of ambient temperature to about 75° C., or in a range of ambient temperature to about 50° C. In some embodiments, unsaturated polymer may be mixed with the peroxy acid at a temperature in a range of about 20° C. to about 95° C., or in a range of about 30° C. to about 50° C. In one preferred embodiment, the temperature at which the unsaturated polymer is mixed with the peroxy acid is ambient temperature in an absence of externally applied heating.

The unsaturated polymer is preferably mixed with the peroxy acid for a length of time less than about 4 hours, more preferably less than about 1 hour, yet more preferably less than about 0.5 hour. In one embodiment, the length of time may be about 10 minutes or less. In another embodiment, the length of time may be about 5 minutes or less. In some embodiment, the length of time may be 30 seconds or more, or 1 minute or more, or 2 minutes or more.

The unsaturated polymer and peroxy acid are mixed in an absence of solvent, for example by dry mixing. The unsaturated polymer is in a solid state; however, the unsaturated polymer is typically sufficiently processible in a mixer to permit mixing of the unsaturated polymer with the peroxy acid. The peroxy acid may be a solid or liquid. Peroxy acid in a solid state is preferred. Mixing of unsaturated polymer and peroxy acid may be accomplished using any suitable mixer in the art. Some examples of mixers for polymers and polymer additives include mills (e.g. roll mills, ball mills), blade mixers, internal mixers (e.g. Banbury™ and Brabender™ mixers), extruders (twin screw, single screw) and the like. Mills are particularly preferred. With a view to effective mixer capacity and the amount of unsaturated polymer and peroxy acid used, the time, temperature and shear while mixing may be controlled to optimize conversion efficiency.

Peroxy Acid:

The peroxy acid preferably comprises an organic peroxy acid. Some examples of peroxy acids include peroxybenzoic acid, analogues of peroxybenzoic acid, peroxyacetic acid, peroxybenzoic acid, trifluoroperoxyacetic acid, magnesium mono-peroxyphthalate or mixtures thereof. Organic peroxy acids which are compounds of formula (I) or (II) are preferred:

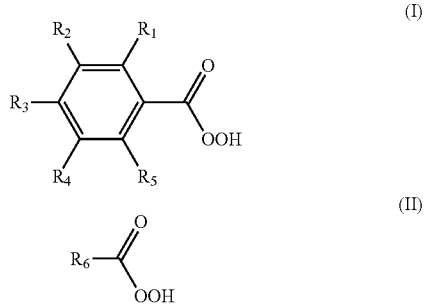

where $R_1$, $R_2$, $R_3$, $R_4$ and $R_5$ are independently hydrogen, methyl, ethyl, phenyl, chloro or bromo, and $R_6$ is hydrogen, methyl, ethyl, propyl, butyl, pentyl or hexyl. Preferably, the organic peroxy acid is a compound of formula (I). Preferably, one of $R_1$, $R_2$, $R_3$, $R_4$ and $R_5$ is chloro. Preferably four of $R_1$, $R_2$, $R_3$, $R_4$ and $R_5$ are hydrogen. The peroxy acid preferably comprises meta-chloroperoxybenzoic acid (mCPBA) or peracetic acid.

The peroxy acid may be used in an amount considerably less than in other solid state epoxidation processes in the art. The peroxy acid is preferably used in an amount of about 5 mol % or less equivalents to unsaturation, even about 3 mol % or less equivalents to unsaturation, while having high conversion efficiency of the unsaturated polymer to the epoxidized polymer. In some embodiments, suitable amounts of the peroxy acid are in a range of 0.1-5 mol %, or 0.4-4 mol % or 0.7-3 mol % equivalents to unsaturation.

For enhanced control over fast kinetics of the epoxidation reaction, a masterbatch approach to mixing is preferred. In this approach, the peroxy acid may be supported on a support matrix, for example a matrix comprising a saturated polymer, and the supported peroxy acid mixed with unsaturated polymer. The saturated polymer preferably comprises a saturated elastomer. Some examples of saturated polymers include polyisobutylene (IB), epichlorohydrin rubber (ECO), polyacrylic rubber (ACM, ABR), silicone rubber (SI, Q, VMQ), fluorosilicone rubber (FVMQ), fluoroelastomers (FKM, and FEPM), perfluoroelastomers (FFKM), polyether block amides (PEBA), chlorosulfonated polyethylene (CSM), ethylene-vinyl acetate (EVA) or mixtures thereof. The saturated polymer preferably comprises a polyisobutylene. Low or medium molecular weight polyisobutylenes are preferred.

Unsaturated Polymer:

The unsaturated polymer preferably comprises an unsaturated elastomer. Unsaturated polymers include, for example, an unsaturated isoolefin copolymer (e.g. butyl rubber (IIR)), a styrene-butadiene rubber (SBR), a polybutadiene rubber (BR), a natural polyisoprene (e.g. cis-1,4-poyliisoprene (NR) or trans-1,4-poyliisoprene (gutta-percha)), a synthetic polyisoprene (IR), a butadiene-acrylonitrile copolymer (nitrile rubber (NR)), hydrogenated nitrile rubbers (HNBR), an ethylene propylene diene monomer (EPDM) copolymer, halogenated polymers thereof or mixtures thereof. Some examples of halogenated unsaturated polymers include chloroprene rubber (CR), chlorobutyl rubber (CIIR), bromobutyl rubber (BIIR) or mixtures thereof. Non-halogenated unsaturated polymers are particularly preferred.

The unsaturated polymer preferably comprises an unsaturated isoolefin copolymer (e.g. butyl rubber (IIR)), a styrene-butadiene rubber (SBR), a polybutadiene rubber (BR), a halogenated polymer thereof or any mixture thereof. In one embodiment, the unsaturated polymer comprises a styrene-butadiene rubber (SBR). In another embodiment, the unsaturated polymer comprises a polybutadiene rubber (BR).

The unsaturated polymer more preferably comprises an unsaturated isoolefin copolymer, even more preferably a butyl polymer or a halobutyl polymer. In one embodiment, the unsaturated polymer comprises a copolymer comprising repeating units derived from at least one isoolefin monomer and repeating units derived from at least one multiolefin monomer.

The isoolefin copolymer is not limited to a special isoolefin. However, isoolefins within the range of from 4 to 16 carbon atoms, preferably 4-7 carbon atoms, such as isobutene, 2-methyl-1-butene, 3-methyl-1-butene, 2-methyl-2-butene, 4-methyl-1-pentene and mixtures thereof are preferred. More preferred is isobutene (isobutylene).

The isoolefin copolymer is not limited to a special multiolefin. Every multiolefin copolymerizable with the isoolefin known by the skilled in the art can be used. However, multiolefins within the range of from 4-14 carbon atoms, such as isoprene, butadiene, 2-methylbutadiene, 2,4-dimethylbutadiene, piperyline, 3-methyl-1,3-pentadiene, 2,4-hexadiene, 2-neopentylbutadiene, 2-methyl-1,5-hexadiene, 2,5-dimethyl-2,4-hexadiene, 2-methyl-1,4-pentadiene, 2-methyl-1,6-heptadiene, cyclopentadiene, methylcyclopentadiene, cyclohexadiene, 1-vinyl-cyclohexadiene and mixtures thereof, preferably conjugated dienes, are used. Isoprene is more preferably used. The unsaturated polymer useful in the present invention may include a co-monomer other than the above referenced multiolefins, such as an alkyl-substituted vinyl aromatic co-monomer, including but not limited to a $C_1$-$C_4$ alkyl substituted styrene, for example para-methylstyrene.

As optional monomers, any monomer copolymerizable with the isoolefins and/or dienes known by the skilled in the art can be used. α-methyl styrene, p-methyl styrene, chlorostyrene, cyclopentadiene and methylcyclopentadiene are preferably used. Indene and other styrene derivatives may also be used. The unsaturated polymer can include, for example, random copolymers of isobutylene, isoprene and para-methyl styrene.

In one embodiment, the isoolefin copolymer may be formed by copolymerization of a monomer mixture. Preferably, the monomer mixture comprises about 80-99.9 mol % of at least one isoolefin monomer and about 0.1-20 mol % of at least one multiolefin monomer, based on the monomers in the monomer mixture. More preferably, the monomer mixture comprises about 90-99.9 mol % of at least one isoolefin monomer and about 0.1-10 mol % of at least one multiolefin monomer. In one embodiment, the monomer mixture comprises about 92.5-97.5 mol % of at least one isoolefin monomer and about 2.5-7.5 mol % of at least one multiolefin monomer. In another embodiment, the monomer mixture comprises about 97.4-95 mol % of at least one isoolefin monomer and about 2.6-5 mol % of at least one multiolefin monomer.

If the monomer mixture comprises the optional monomer copolymerizable with the isoolefins and/or dienes, the optional monomer preferably replaces a portion of the multiolefin monomer. The monomer mixture may also comprise from 0.01% to 1% by weight of at least one multiolefin cross-linking agent, and when the multiolefin cross-linking agent is present, the amount of multiolefin monomer is reduced correspondingly.

The isoolefin copolymer may be formed by copolymerization of a monomer mixture, for example by solution polymerization. A solution polymerization reaction is performed in the presence of an initiator system (e.g. a Lewis acid catalyst and a proton source) capable of initiating the polymerization process. A proton source suitable in the present invention includes any compound that will produce a proton when added to the Lewis acid or a composition containing the Lewis acid. Protons may be generated from the reaction of the Lewis acid with proton sources to produce the proton and the corresponding by-product. Such reaction may be preferred in the event that the reaction of the proton source is faster with the protonated additive as compared with its reaction with the monomers. Proton generating reactants include, for example such as water, alcohols, phenol thiols, carboxylic acids, and the like or any mixture thereof. Water, alcohol, phenol or any mixture thereof is preferred. The most preferred proton source is water. A preferred ratio of Lewis acid to proton source is from 5:1 to 100:1 by weight, or from 5:1 to 50:1 by weight. The initiator system including the catalyst and proton source is preferably present in the reaction mixture in an amount of 0.02-0.1 wt %, based on total weight of the reaction mixture.

Alkyl aluminum halide catalysts are a particularly preferred class of Lewis acids for catalyzing solution polymerization reactions in accordance with the present invention. Examples of alkyl aluminum halide catalysts include methyl aluminum dibromide, methyl aluminum dichloride, ethyl aluminum dibromide, ethyl aluminum dichloride, butyl aluminum dibromide, butyl aluminum dichloride, dimethyl aluminum bromide, dimethyl aluminum chloride, diethyl aluminum bromide, diethyl aluminum chloride, dibutyl aluminum bromide, dibutyl aluminum chloride, methyl aluminum sesquibromide, methyl aluminum sesquichloride, ethyl aluminum sesquibromide, ethyl aluminum sesquichloride and any mixture thereof. Preferred are diethyl aluminum chloride ($Et_2AlCl$ or DEAC), ethyl aluminum sesquichloride ($Et_{1.5}AlCl_{1.5}$ or EASC), ethyl aluminum dichloride ($EtAlCl_2$ or EADC), diethyl aluminum bromide ($Et_2AlBr$ or DEAB), ethyl aluminum sesquibromide ($Et_{1.5}AlBr_{1.5}$ or EASB) and ethyl aluminum dibromide ($EtAlBr_2$ or EADB) and any mixture thereof. In a particularly preferred initiator system, the catalyst comprises ethyl aluminum sesquichloride, preferably generated by mixing equimolar amounts of diethyl aluminum chloride and ethyl aluminum dichloride, preferably in a diluent. The diluent is preferably the same one used to perform the copolymerization reaction.

One or more other catalysts useful in solution copolymerization of isoolefins may also be present in the initiator system, for example titanium tetrachloride, stannous tetrachloride, boron trifluoride, boron trichloride, or methylalumoxane. The monomers are generally polymerized cationically, preferably at temperatures in the range of from about −100° C. to about −50° C., preferably in the range of from about −95° C. to about −65° C. The temperature is preferably about −80° C. or greater.

The solution comprises 0-30 vol % of an aliphatic hydrocarbon diluent, based on volume of the solution. In preferred embodiments, the solution comprises 0.1-30 vol % or 0.1-20 vol % of the aliphatic hydrocarbon diluent. The aliphatic hydrocarbon may be in a common aliphatic medium comprising at least 80 wt % of one or more aliphatic hydrocarbons having a boiling point in the range of 45° C. to 80° C. at a pressure of 1013 hPa, preferably at least 90 wt %, and even more preferably at least 95 wt %. Aliphatic hydrocarbons having a boiling point in the range of 45° C. to 80° C. at a pressure of 1013 hPa include cyclopentane, 2,2-dimethylbutane, 2,3-dimethylbutane, 2-methylpentane, 3-methylpentane, n-hexane, methylcyclopentane and 2,2-dimethylpentane.

A C6 solvent is a particularly preferred choice for use in a solution process. A lower molecular weight solvent, such as C5 or lighter, has a boiling point close to the monomers and the monomers therefore may not be separable from the solution by distillation. A higher molecular weight solvent, such as C7 or heavier, would be more difficult to separate from the rubber after halogenation. The solution viscosity provided by use of a C7 solvent is also significantly higher than with a C6 solvent, making the solution more difficult to handle and impeding heat transfer in the reactor, even when provided with the high monomer to solvent ratios described above. As a result, the C6 solvents of the present invention are a preferred selection from among the available solvents. C6 solvents suitable for use in the present invention preferably have a boiling point of between 50° C. and 69° C. Examples of preferred C6 solvents include n-hexane or hexane isomers, such as 2-methyl pentane or 3-methyl pentane, or mixtures of n-hexane and such isomers as well as cyclohexane. The common aliphatic medium may, for example, further comprise other compounds which are inert under polymerization conditions such as other aliphatic hydrocarbons, for example heptanes and octanes having a boiling point of more than 80° C. at a pressure of 1013 hPa, propanes, butanes, n-pentane, cyclohexane as well as halohydrocarbons such as methylchloride, hydrofluorocarbon (HFC) and other halogenated aliphatic hydrocarbons which are inert under reaction conditions.

Copolymerization process may be performed as a batch process in a batch reactor or a continuous process (e.g. a plug flow process) in a continuous reactor. In a continuous process, the process is preferably performed with at least the following feed streams: solvent/diluent+isoolefin (preferably isobutene)+multiolefin (preferably diene, isoprene); initiator system; and, optionally, a multiolefin cross-linking agent.

It should be noted that the multiolefin crosslinking agent can also be added in the same feed stream as the isoolefin and multiolefin. While cross-linking agents are not necessary to increase molecular weight of the copolymer to a processable level, cross-linking agents may nevertheless be used if desired.

To form a halogenated isoolefin copolymer, the isoolefin copolymer may be subjected to a halogenation process. Bromination or chlorination can be performed according to a process known by those skilled in the art, for example, the procedures described in Rubber Technology, 3rd Ed., Edited by Maurice Morton, Kluwer Academic Publishers, pp. 297-300 and further documents cited therein. Preferably, halogenation is performed according to a process as described in U.S. Pat. No. 5,886,106 issued Mar. 23, 1999, the contents of which is herein incorporated by reference. The amount of halogenating agent added is controlled to provide a final halogen content of 0.05-2.5 mol % in the halogenated copolymer. Halogenation agents useful for halogenating isoolefin copolymer may comprise elemental chlorine ($Cl_2$) or bromine ($Br_2$) and/or organo-halide precursors thereto, for example dibromo-dimethyl hydantoin, trichloroisocyanuric acid (TCIA), n-bromosuccinimide, or the like. Preferably, the halogenation agent comprises or is bromine. Preferably, halogenation comprises bromination.

During halogenation of an isoolefin copolymer containing conjugated dienes, such as isoprene, some or all of the multiolefin content of the isoolefin copolymer is converted to allylic halides. The total allylic halide content of the halogenated isoolefin copolymer may not exceed the starting multiolefin content of the parent isoolefin copolymer. The allylic halide sites allow for reacting with and attaching a nucleophile to the halogenated isoolefin copolymer. For halogenated isoolefin copolymers containing no allylic halides, for example, halogenated isoolefin copolymer derived from isobutylene and styrenic monomers, benzylic halides, formed by halogenation of the styrenic monomer, may be reacted to form the ionomer rather than allylic halides. The same logic would therefore apply to benzylic halides as allylic halides; the total amount of ionomeric moieties cannot exceed the available amount of benzylic halides.

Additives:

The epoxidized polymer may be compounded with various auxiliary products, shaped into an article, and the resulting compound cured. Auxiliary products for polymers (e.g. rubbers) include, for example, reaction accelerators, vulcanizing accelerators, vulcanizing acceleration auxiliaries, antioxidants, foaming agents, anti-aging agents, heat stabilizers, light stabilizers, ozone stabilizers, processing aids, plasticizers, tackifiers, blowing agents, dyestuffs, pigments, waxes, extenders, organic acids, inhibitors, metal oxides, and activators such as triethanolamine, polyethylene glycol, hexanetriol, etc., which are known to the rubber industry. The rubber aids are used in conventional amounts that depend, inter alia, on the intended use. Further information on vulcanization may be obtained in Encyclopedia of Polymer Science and Engineering, Vol. 17, s. 666 et seq. (Vulcanization).

In a particular embodiment, the epoxidized polymer may be compounded with a suitable filler (e.g. mineral and/or non-mineral fillers) to enhance certain desirable physical properties, such as tensile strength, viscosity, hardness, permeability, etc. Suitable fillers are selected from those that do not impart undesirable residues or otherwise adversely affect the polymer for use in the aforementioned "clean" applications. Examples of suitable fillers include silica, silicates, high aspect ratio or nano-sized versions thereof, and other suitable clean fillers. The selection of filler for imparting desired physical properties while retaining clean characteristics is within the purview of persons skilled in the art. Conventional amounts of fillers are from about 1 to 150 phr (parts per hundred rubber).

Curing:

The epoxidized polymer produced by the process may further be cured by any suitable method, for example sulfur-based curatives, peroxide-based curatives, ZnO curatives, resin cure systems or UV light. A typical sulfur-based curing system comprises: (i) a metal oxide, (ii) elemental sulfur and (iii) at least one sulfur-based accelerator. The use of metal oxides as a component in the curing system is well known in the art. A suitable metal oxide is zinc oxide, which is typically used in the amount of from about 1 to about 10, preferably from about 2 to about 5, parts by weight per hundred parts by weight polymer in the composition. Elemental sulfur, comprising component (ii) of the preferred curing system is typically used in amounts of from about 0.2 to about 10 parts by weight per hundred parts by weight polymer in the composition. Suitable sulfur-based accelerators (component (iii) of the preferred curing system) are typically used in amounts of from about 0.5 to about 3 parts by weight, per hundred parts by weight polymer in the composition. Non-limiting examples of useful sulfur-based accelerators may be selected from the thiuram sulfides such as tetramethyl thiuram disulfide (TMTD), the thiocarbamates such as zinc dimethyl dithiocarbamate (ZDC) and the thiazyl and benzothiazyl compounds such as mercaptobenzothiazyl disulfide (MBTS). Preferably, the sulphur based accelerator is mercaptobenzothiazyl disulfide. In some embodiments of a resin cure system, the resin cure system may comprise a halogenated phenol formaldehyde resin or a phenol formaldehyde resin, optionally in conjunction with an activator. Halogenated phenol formaldehyde resins and phenol formaldehyde resins are known in the art as described in U.S. Pat. Nos. 2,701,895, 3,093,613 and 3,165,496, which are herein incorporated by reference. An alkyl phenol-formaldehyde derivative, for example octylphenol-formaldehyde with methylol active group, is typical. Metal oxides, for example zinc oxide, and/or other curing or processing aids (e.g. stearic acid) may also be used in the resin cure system. Metal oxides may be used in the amount of from about 1 to about 10 parts by weight per hundred parts by weight polymer in the composition. Resin may be used in amounts of from about 0.2 to about 20 phr. Other curing or processing aids may be used in amounts of from about 0.2 to about 10 phr.

EXAMPLES

Example 1: Epoxidation of Regular, Bromo and Chloro Butyl Rubber (IIR, BIIR and CIIR)

To a preheated mill (30° C. or 50° C.) was added butyl rubber. Once the elastomer had banded, m-chloroperoxybenzoic acid (MCPBA, <77% pure, purchased from Sigma Aldrich) was slowly added as a powder. The material was refined by 6×% cuts and 6× end-wise passes. The well dispersed material was allowed to mill for an additional time as specified in Table 1. The material was then removed from the mill and epoxy mol % determined by $^1$H NMR. RB301, RB40 and RB402 are regular butyl rubbers. BB2030 and BB4010 are bromobutyl rubbers. CB1240 is a chlorobutyl rubber.

Example 2: Epoxidation of SBR and BR

To a preheated mill (30° C. or 50° C.) was added the rubber. Once the elastomer had banded, m-chloroperoxybenzoic acid (MCPBA, <77% pure, purchased from Sigma Aldrich) was slowly added as a polyisobutylene masterbatch (20 g MCPBA dispersed in 100 g of PIB with Mv of about 800 kg/mol). The material was refined by 6×% cuts and 6× end-wise passes. The well dispersed material was allowed to mill for an additional time as specified in Table 1. The material was then removed from the mill and epoxy mol % determined by $^1$H NMR. BR CB24 is a butadiene rubber and SBR Buna SL 4525-0 is a styrene-butadiene rubber.

For Examples 1 and 2, $^1$H NMR data was obtained using a Bruker DRX 500 MHz spectrometer (500.13 MHz) in CDCl$_3$ with trimethylsilane (TMS) added as an internal standard. The mol % epoxidized was determined using $^1$H NMR macros.

TABLE 1

| Rubber Type | g Rubber | g mCPBA | mole % mCPBA added | Temp. (° C.) | Time (min) | mole % epoxidized (by$^1$H NMR) | Efficiency |
|---|---|---|---|---|---|---|---|
| RB301 | 100 | 3 | 0.73 | 50 | 2 | 0.92 | 100% |
| RB301 | 100 | 3 | 0.73 | 50 | 5 | 0.89 | 100% |
| RB301 | 100 | 3 | 0.73 | 50 | 10 | 0.89 | 100% |
| RB301 | 100 | 3 | 0.73 | 50 | 10 | 0.87 | 100% |
| RB301 | 100 | 4.5 | 1.10 | 50 | 2 | 1.16 | 100% |
| RB301 | 100 | 4.5 | 1.10 | 50 | 5 | 1.18 | 100% |
| RB301 | 100 | 4.5 | 1.10 | 50 | 10 | 1.03 | 94% |
| RB40 | 100 | 6 | 1.47 | 30 | 2 | 1.33 | 91% |
| RB40 | 100 | 12 | 2.93 | 30 | 2 | 2.68 | 91% |
| RB40 | 100 | 12 | 2.93 | 50 | 10 | 2.84 | 97% |
| BB2030 | 100 | 1.3 | 0.32 | 50 | 2 | 0.17 | 54% |
| BB2030 | 100 | 1.3 | 0.32 | 50 | 5 | 0.18 | 57% |
| BB2030 | 100 | 1.3 | 0.32 | 50 | 10 | 0.21 | 66% |
| BB4010 | 100 | 8 | 1.96 | 30 | 2 | 1.9 | 97% |
| BB4010 | 100 | 8 | 1.96 | 50 | 2 | 1.44 | 74% |
| BB4010 | 100 | 8 | 1.96 | 50 | 5 | 1.66 | 85% |
| BB4010 | 100 | 8 | 1.96 | 50 | 10 | 1.46 | 75% |
| BB4010 | 100 | 8 | 1.96 | 50 | 10 | 1.93 | 99% |
| BB40-0.25% | 100 | 10.5 | 2.57 | 30 | 2 | 2.49 | 97% |
| CB1240 | 100 | 1 | 0.24 | 30 | 2 | 0.08 | 33% |
| RB402 | 1000 | 31 | 0.76 | 50 | 5 | 0.81 | 100% |
| BR CB24 with a PIB masterbatch | 50 | 1 | 0.47 | 30 | 5 | 0.46 | 98% |
| SBR Buna SL 4525-0 with a PIB masterbatch | 50 | 1 | 0.53 | 30 | 5 | 0.31 | 58% |

The novel features will become apparent to those of skill in the art upon examination of the description. It should be understood, however, that the scope of the claims should not be limited by the embodiments, but should be given the broadest interpretation consistent with the wording of the claims and the specification as a whole.

What is claimed is:

1. A process for epoxidation of an unsaturated polymer, the process comprising mixing a solid unsaturated polymer and a peroxy acid in an absence of solvent to produce an epoxidized polymer,
   wherein the unsaturated polymer comprises a copolymer comprising repeating units derived from at least one isoolefin monomer and repeating units derived from at least one multiolefin monomer.

2. The process according to claim 1, wherein the unsaturated polymer is mixed with the peroxy acid in an absence of a catalyst.

3. The process according to claim 1, wherein the peroxy acid is a compound of formula (I):

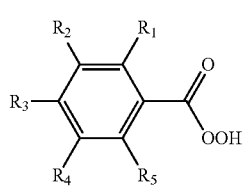

where $R_1$, $R_2$, $R_3$, $R_4$ and $R_5$ are independently hydrogen, methyl, ethyl, phenyl, chloro or bromo.

4. The process according to claim 1, wherein the peroxy acid comprises m-chloroperoxybenzoic acid and/or a compound of formula (II):

where $R_6$ is hydrogen, methyl, ethyl, propyl, butyl, pentyl or hexyl.

5. The process according to claim 1, wherein the unsaturated polymer is mixed with the peroxy acid at a temperature of ambient temperature to about 95° C.

6. The process according to claim 1, wherein the unsaturated polymer is mixed with the peroxy acid for less than about 1 hour.

7. The process according to claim 1, wherein the copolymer is an unsaturated elastomer.

8. The process according to claim 1, wherein the copolymer is a non-halogenated or halogenated butyl rubber.

9. The process according to claim 1, wherein the at least one isoolefin monomer comprises isobutane.

10. The process according to claim 1, wherein the at least one multiolefin monomer comprises isoprene.

11. A process for epoxidation of an unsaturated polymer, the process comprising: mixing an unsaturated polymer and a peroxy acid in an absence of solvent to produce an epoxidized polymer,
    wherein the peroxy acid is supported on a matrix comprising a saturated polymer.

12. The process according to claim 11, wherein the saturated polymer comprises polyisobutylene.

13. The process according to claim 11, wherein the unsaturated polymer comprises an unsaturated isoolefin copolymer, a styrene-butadiene rubber, a polybutadiene rubber, a natural polyisoprene, a synthetic polyisoprene, a butadiene-acrylonitrile copolymer, an ethylene propylene diene monomer (EPDM) copolymer, halogenated polymers thereof or mixtures thereof.

14. The process according to claim 11, wherein the unsaturated polymer comprises a copolymer comprising repeating units derived from at least one isoolefin monomer and repeating units derived from at least one multiolefin monomer.

15. The process according to claim 11, wherein:
the peroxy acid is a compound of formula (I):

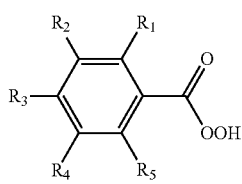

(I)

where $R_1$, $R_2$, $R_3$, $R_4$ and $R_5$ are independently hydrogen, methyl, ethyl, phenyl, chloro or bromo; and
the unsaturated polymer comprises an unsaturated elastomer.

16. The process according to claim 15, wherein the unsaturated elastomer is selected from the group consisting of:
a copolymer comprising repeating units derived from at least one isoolefin monomer and repeating units derived from at least one multiolefin monomer, an unsaturated isoolefin copolymer, a styrene-butadiene rubber, a polybutadiene rubber, a natural polyisoprene, a synthetic polyisoprene, a butadiene-acrylonitrile copolymer, an ethylene propylene diene monomer (EPDM) copolymer, halogenated polymers thereof and mixtures thereof.

17. A process for epoxidation of an unsaturated polymer, the process comprising mixing an unsaturated polymer and a peroxy acid in an absence of solvent to produce an epoxidized polymer;
wherein the peroxy acid comprises m-chloroperoxybenzoic acid and/or a compound of formula (II):

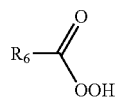

(II)

where $R_6$ is hydrogen, methyl, ethyl, propyl, butyl, pentyl or hexyl; and
the peroxy acid is supported on a matrix comprising a saturated polymer.

18. The process according to claim 17, wherein:
the peroxy acid comprises m-chloroperoxybenzoic acid and/or a compound of formula (II):

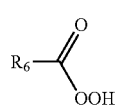

(II)

where $R_6$ is methyl;
the peroxy acid is supported on a matrix comprising polyisobutylene;
the unsaturated polymer is a non-halogenated or halogenated butyl rubber; and
the unsaturated polymer is mixed with the peroxy acid in an absence of a catalyst.

19. The process according to claim 18, wherein the unsaturated polymer is mixed with the peroxy acid at a temperature of ambient temperature to about 50° C., and for a period of time less than about 0.5 hour.

20. The process according to claim 19, wherein the unsaturated polymer is mixed with the peroxy acid at ambient temperature in an absence of externally applied heating, and for a period of time of about 10 minutes or less.